United States Patent
Chavan et al.

(10) Patent No.: US 10,372,706 B2
(45) Date of Patent: Aug. 6, 2019

(54) TRACKING AND MAINTAINING EXPRESSION STATISTICS ACROSS DATABASE QUERIES

(71) Applicant: Oracle International Corporation, Redwood Shores, CA (US)

(72) Inventors: Shasank K. Chavan, Menlo Park, CA (US); Aurosish Mishra, Belmont, CA (US); Mohamed Zait, San Jose, CA (US); Sunil P. Chakkappen, Foster City, CA (US); Can Tuzla, San Mateo, CA (US); Jiaqi Yan, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 536 days.

(21) Appl. No.: 15/146,798

(22) Filed: May 4, 2016

(65) Prior Publication Data

US 2017/0031967 A1 Feb. 2, 2017

Related U.S. Application Data

(60) Provisional application No. 62/198,572, filed on Jul. 29, 2015, provisional application No. 62/245,959, filed on Oct. 23, 2015.

(51) Int. Cl.
*G06F 16/00* (2019.01)
*G06F 16/2453* (2019.01)
(Continued)

(52) U.S. Cl.
CPC ...... *G06F 16/2454* (2019.01); *G06F 12/0802* (2013.01); *G06F 16/2255* (2019.01);
(Continued)

(58) Field of Classification Search
CPC .......... G06F 17/3046; G06F 17/30463; G06F 17/30442; G06F 16/2454; G06F 16/2453
(Continued)

(56) References Cited

U.S. PATENT DOCUMENTS 4,815,030 A 3/1989 Cross et al.
5,072,405 A 12/1991 Ramakrisha et al.
(Continued)

FOREIGN PATENT DOCUMENTS

EP 0743596 A2 11/1996
EP 0 959 416 A2 11/1999
(Continued)

OTHER PUBLICATIONS

Mishra, U.S. Appl. No. 15/146,799, filed May 4, 2016, Office Action, dated Jun. 14, 2018.
(Continued)

*Primary Examiner* — Thu Nguyet T Le
(74) *Attorney, Agent, or Firm* — Hickman Palermo Becker Bingham LLP

(57) ABSTRACT

Techniques are described for maintaining an expression statistics store that stores and updates metadata values for query expressions based on the occurrence of those query expressions within queries. In an embodiment, a database server instance receives a database query. In response, the database server instance identifies expressions within the database queries. The database server instance then determines whether an expression statistics store includes an entry for the particular expression. Responsive to determining that the expression statistics store includes an entry for the particular expression, the database server instance updates at least one metadata value in the entry based on the occurrence of the particular expression. Responsive to determining that the expression statistics store does not include
(Continued)

| Expression Statistics Store (ESS) 100 | | | | | | | | | |
|---|---|---|---|---|---|---|---|---|---|
| Expression ID | Table ID | Occurrence Count | Evaluation Count | Static Cost | Cumulative Cost | Created | Last Modified | Expression Text | |
| 102 | t | 5 | 450 | 7 | 3,150 | SCN 512 | SCN 1250 | a/b | ... |
| 104 | t | 8 | 1000 | 3 | 3,000 | SCN 203 | SCN 1321 | a+c | ... |
| ... | ... | ... | ... | ... | ... | ... | ... | ... | ... |

| Column List 110 | | | | |
|---|---|---|---|---|
| Column ID | Table ID | Access Count | Last Accessed | |
| a | t | 1450 | SCN 1321 | ... |
| b | t | 450 | SCN 1250 | ... |
| c | t | 1000 | SCN 1321 | ... |
| ... | ... | ... | ... | ... | an entry for the particular expression, the database server instance adds an entry for the particular expression.

20 Claims, 4 Drawing Sheets

(51) Int. Cl.
　　G06F 16/23　　　(2019.01)
　　G06F 16/22　　　(2019.01)
　　G06F 16/2455　　(2019.01)
　　G06F 12/0802　　(2016.01)
(52) U.S. Cl.
　　CPC .......... *G06F 16/2282* (2019.01); *G06F 16/23*
　　　　(2019.01); *G06F 16/2393* (2019.01); *G06F*
　　　　*16/2453* (2019.01); *G06F 16/2455* (2019.01);
　　　　　　　　　　　　*G06F 2212/60* (2013.01)
(58) Field of Classification Search
　　USPC ......................................................... 707/713
　　See application file for complete search history.

(56) References Cited

U.S. PATENT DOCUMENTS

| | | | |
|---|---|---|---|
| 5,325,292 A | 6/1994 | Crockett | |
| 5,446,885 A | 8/1995 | Moore et al. | |
| 5,625,820 A | 4/1997 | Hermsmeier et al. | |
| 5,680,602 A | 10/1997 | Bloem et al. | |
| 5,778,350 A | 7/1998 | Adams et al. | |
| 5,819,255 A * | 10/1998 | Celis ............... | G06F 17/30463 |
| 5,870,552 A | 2/1999 | Dozier et al. | |
| 5,873,075 A | 2/1999 | Cochrane et al. | |
| 5,873,084 A | 2/1999 | Brancho et al. | |
| 5,873,091 A | 2/1999 | Garth et al. | |
| 5,899,986 A | 5/1999 | Ziauddin | |
| 5,940,832 A | 8/1999 | Hamada et al. | |
| 5,970,244 A | 10/1999 | Nagahashi et al. | |
| 5,991,733 A | 11/1999 | Aleia et al. | |
| 6,003,022 A | 12/1999 | Eberhard et al. | |
| 6,021,443 A | 2/2000 | Bracho et al. | |
| 6,035,306 A | 3/2000 | Lowenthal et al. | |
| 6,038,601 A | 3/2000 | Lambert et al. | |
| 6,067,540 A | 5/2000 | Ozbutun et al. | |
| 6,070,160 A | 5/2000 | Geary | |
| 6,085,191 A | 7/2000 | Fisher et al. | |
| 6,115,703 A | 9/2000 | Bireley | |
| 6,122,639 A | 9/2000 | Babu et al. | |
| 6,122,664 A | 9/2000 | Boukobza et al. | |
| 6,173,154 B1 | 1/2001 | Kucinski et al. | |
| 6,189,022 B1 | 2/2001 | Binns | |
| 6,195,676 B1 | 2/2001 | Spix et al. | |
| 6,223,171 B1 | 4/2001 | Chaudhuri et al. | |
| 6,285,997 B1 | 9/2001 | Carey et al. | |
| 6,321,218 B1 | 11/2001 | Guay et al. | |
| 6,353,828 B1 | 3/2002 | Ganesh | |
| 6,356,880 B1 | 3/2002 | Goossens et al. | |
| 6,370,552 B1 | 4/2002 | Agarwal et al. | |
| 6,377,943 B1 | 4/2002 | Jakobsson | |
| 6,389,430 B1 | 5/2002 | Parker | |
| 6,401,090 B1 | 6/2002 | Bailis et al. | |
| 6,405,191 B1 | 6/2002 | Bhatt et al. | |
| 6,427,146 B1 | 7/2002 | Chu | |
| 6,442,568 B1 | 8/2002 | Velasco et al. | |
| 6,470,330 B1 | 10/2002 | Das et al. | |
| 6,502,093 B1 | 12/2002 | Bhatt et al. | |
| 6,519,580 B1 | 2/2003 | Johnson et al. | |
| 6,539,371 B1 | 3/2003 | Bleizeffer et al. | |
| 6,553,369 B1 | 4/2003 | Guay et al. | |
| 6,564,207 B1 | 5/2003 | Abdoh | |
| 6,604,093 B1 | 8/2003 | Etzion et al. | |
| 6,604,100 B1 | 8/2003 | Fernandez et al. | |
| 6,665,684 B2 | 12/2003 | Zait et al. | |
| 6,681,383 B1 | 1/2004 | Pastor et al. | |
| 6,691,155 B2 | 2/2004 | Gottfried | |
| 6,757,675 B2 | 6/2004 | Aiken et al. | |
| 6,766,318 B1 | 7/2004 | Guay et al. | |
| 6,850,893 B2 | 2/2005 | Lipkin et al. | |
| 6,865,567 B1 | 3/2005 | Commen | |
| 6,901,410 B2 | 5/2005 | Marron et al. | |
| 6,917,946 B2 | 7/2005 | Corl, Jr. et al. | |
| 7,092,954 B1 | 8/2006 | Ramesh | |
| 7,127,467 B2 | 10/2006 | Yalamanchi et al. | |
| 7,480,302 B2 | 1/2009 | Choi | |
| 7,512,589 B2 | 3/2009 | Stokkan et al. | |
| 7,636,731 B2 | 12/2009 | Curanes et al. | |
| 9,183,254 B1 | 11/2015 | Cole | |
| 2001/0047270 A1 | 11/2001 | Gusick et al. | |
| 2002/0062475 A1 | 5/2002 | Iborra et al. | |
| 2002/0152149 A1 | 10/2002 | Tanaka | |
| 2003/0046421 A1 | 3/2003 | Horvitz et al. | |
| 2003/0097365 A1 | 5/2003 | Stickler | |
| 2003/0120642 A1 | 6/2003 | Egilsson et al. | |
| 2003/0182268 A1 | 9/2003 | Lal | |
| 2003/0187858 A1 | 10/2003 | Kirk | |
| 2003/0187862 A1 | 10/2003 | Brobst | |
| 2003/0236834 A1 | 12/2003 | Gottfried | |
| 2004/0181543 A1 | 9/2004 | Wu et al. | |
| 2004/0193575 A1 | 9/2004 | Chen et al. | |
| 2005/0203940 A1 | 9/2005 | Farrar et al. | |
| 2005/0222978 A1 | 10/2005 | Drory et al. | |
| 2005/0283458 A1* | 12/2005 | Galindo-Legaria ......................... G06F 17/30312 |
| 2006/0047696 A1 | 3/2006 | Larson | |
| 2006/0083227 A1 | 4/2006 | Eldar | |
| 2006/0085592 A1 | 4/2006 | Ganguly et al. | |
| 2006/0195437 A1 | 8/2006 | Dietel | |
| 2006/0230017 A1 | 10/2006 | Larson | |
| 2006/0242694 A1 | 10/2006 | Gold et al. | |
| 2006/0288026 A1 | 12/2006 | Zayas et al. | |
| 2006/0288030 A1 | 12/2006 | Lawrence | |
| 2007/0043757 A1 | 2/2007 | Benton et al. | |
| 2007/0112736 A1 | 5/2007 | Okamoto et al. | |
| 2007/0179934 A1 | 8/2007 | Basov et al. | |
| 2007/0226237 A1 | 9/2007 | Gong et al. | |
| 2008/0059412 A1 | 3/2008 | Tarin | |
| 2008/0120274 A1 | 5/2008 | Curanes et al. | |
| 2008/0120275 A1 | 5/2008 | Cruanes et al. | |
| 2008/0177722 A1 | 7/2008 | Lohman | |
| 2008/0281801 A1 | 11/2008 | Larson et al. | |
| 2009/0150366 A1 | 6/2009 | Basu et al. | |
| 2010/0235347 A1* | 9/2010 | Chaudhuri ........ G06F 16/24542 707/713 |
| 2011/0106843 A1 | 5/2011 | Pan | |
| 2011/0264687 A1 | 10/2011 | Surtani | |
| 2014/0195503 A1 | 7/2014 | Kao | |
| 2015/0347512 A1* | 12/2015 | Luo ..................... G06F 16/2455 707/720 |
| 2016/0179836 A1 | 6/2016 | Guo | |

FOREIGN PATENT DOCUMENTS

| | | |
|---|---|---|
| GB | 2 274 182 A | 7/1994 |
| GB | 2 354 847 A | 4/2001 |
| GB | 2 354 848 A | 4/2001 |
| JP | 05089143 | 4/1993 |
| JP | 06319024 | 11/1994 |
| WO | WO 98/33131 A1 | 7/1998 |
| WO | WO 01/08048 A1 | 2/2001 |
| WO | WO 01/88795 A1 | 11/2001 |
| WO | WO 03098479 A | 5/2003 |

OTHER PUBLICATIONS

Chavan, U.S. Appl. No. 15/146,801, filed May 4, 2016, Office Action, dated May 17, 2018.
"22 SQL Access Using Resource_View and Path_View" Oracle® XML DB Developer's Guide 10g Release 2 (10.2) downloaded from the Internet on Jul. 15, 2009.
M.F. Wyle, "A Wide Area Network Information Filter," Proceedings International Conference on Artificial Intelligence Applications on

(56) References Cited

OTHER PUBLICATIONS

Wall Street, Oct. 9, 1991, New York, US, Los Alamitos, CA Oct. 9, 1991, XP000534152, pp. 10-15.
Jim Binkley, et al: "Rama: An Architecture for Internet Information Filtering," Journal of Intelligent Information Systems, vol. 5, No. 2, Sep. 1, 1995 (Sep. 1, 1995), XP000617268, pp. 81-99.
Patrick A. O'Donnell, et al., "Deadlock-Free and Collision-Free Coordination of Two Robot Manipulators," 1989, IEEE, XP000041486, pp. 484-489.
Clara Nippl, et al., "Accelerating Profiling Services by Parallel Database Technology," undated, 9 pages.
Norman W. Paton, et al., "Active Database Systems," Mar. 1999, ACM Computing Surveys, vol. 31, No. 1., pp. 63-103.
Gianluigi Greco et al., Event Choice Datalog: A Logic Programming Language for Reasoning in Multiple Dimensions, dated 2004, ACM Press, pp. 238-249.
Poess, Meikel, et al., "New TPC Benchmarks for Decision Support and Web Commerce", ACM Press, retrieved from website: < http://www.sigmod.org/record/issues/0012/standards.pdf >, published Dec. 2000, 8 pages.
Selinger, P. Griffiths, et al., "Access Path Selection in a Relational Database Management System", ACM Inc., Proceedings of the 1979 ACM SIGMOD International Conference on the Management of Data, dated Oct. 2002, pp. 23-34.
Cyran, Michele, et al., "Oracle® Database Concepts", Oracle, 10g Release 2 (10.2), dated Oct. 2005, 16 pages.
publib.boulder.ibm.com, "Collecting statistics on a sample of the table data", DB2 Version 9 for Linux, UNIX, and Windows, retrieved from website: http://publib.boulder.ibm.com/infocenter/db2luw/v9/index.j sp?topic=/com.ibm.db2.udb.admin.doc/doc/c0011393.htm >, last updated Oct. 27, 2006, 1 page.
publib.boulder.ibm.com, "RUNSTATS command", DB2 Version 9 for Linux, UNIX, and Windows, Retrieved from website: http://publib.boulder.ibm.com/infocenter/db2luw/v8/index.jsp?topic=/com.ibm.db2.udb.doc/core/r0001980.htm, last updated Oct. 27, 2006, 8 pages.
Microsoft, "SQL Server Query Optimization and Tuning", Microsoft TechNet, Retrieved from website: < http://www.microsoft.com/technet/community/chats/trans/sql/sq10909.mspx >, Published Sep. 9, 2003, 7 pages.
Hanson, Eric N., et al., "Statistics Used by the Query Optimizer in Microsoft SQL Server 2005", Microsoft TechNet, retrieved from website: < http://www.microsoft.com/technet/prodtechnol/sql/2005/qrystats.mspx >, printed Mar. 27, 2007, 13 pages.
Gibbons, Phillip B., et al., "Distinct Sampling for Highly-Accurate Answers to Distinct Values Queries and Event Reports", Proceedings of the 27th VLDB Conference, 2001, 10 pages.
Othayoth, Raghunath, et al., "The Making of TPC-DS", Copyright 2006 VLDB Endowment, ACM, retrieved from website: < http://www.vldb.org/conf/2006/p1049-othayoth.pdf >, 10 pages.
Segev, A. et al., "Rule Activation Techniques in Active Database Systems", Journal of Intelligent Information Systems, 7(2):173-194, Oct. 1996, 23 pages.
IBM Corp., "Improved Rete Algorithm—Hashing Techniques Applied to Partial Match Memories," IBM Technical Disclosure Bulletin, vol. 35, No. 3, Aug. 1992, p. 149.

Charles L. Forgy, "Rete: A Fast Algorithm for the Many Pattern/Many Object Pattern Match Problem," *Artificial Intelligence*, 1982, pp. 17-37.
Marcos K. Aguilera, et al., "Matching Events in a Content-based Subscription System," 1999, Symposium on Principles of Distributed Computing, 9 pages.
Umeshwar Dayal, et al., "Active Database Systems," *Modern Database Systems: The Object Model, Interoperability, and Beyond*, Addison-Wesley, Reading, Massachusetts, Sep. 1994, 25 pages.
Jagannathan Srinivasan, et al., "Extensible Indexing: A Framework for Integrating Domain-Specific Indexing Schemes Into Oracle8i," Oracle Corporation, 16th International Conference on Data Engineering, Feb. 28-Mar. 3, 2000, San Diego, California, 10 pages.
Patrick O'Neil, et al., "Improved Query Performance with Variant Indexes," SIGMOD '97 May 1997, Tucson, Arizona, USA, pp. 1-12.
Eric N. Hanson, et al., "Optimized Rule Condition Testing in Ariel using Gator Networks," Oct. 23, 1995, University of Florida, TR-95-027, pp. 1-24.
Grosof, Benjamin N. et al., "Sweet Deal: Representing Agent Contracts with Exceptions using XML Rules. Ontologies, and Process Descriptions," XP002354519, pp. 340-348.
Bea, :Using Expressions and Conditions, WebLogic Process Integrator Release 1.1, 2000, located on the internet at <http://e-docs.bea.com/wlpi/wlpi11/studio/ch6.htm>, retrieved on Dec. 29, 2005, 12 pages.
Chamberlain, Don, "Query Languages and XML," PowerPoint Presentation, IBM Almaden Research Center, Dec. 2000, located on the internet at <http://www-db.sc.wisc.edu/dbseminar/fall00/talks/chamberlain>, 26 pages.
Chamberlain, Don et al., "XQuery: A Query Language for XML," W3C Working Draft, Feb. 15, 2001, located on the internet at <http://www.w3.org/TR/2001/WD-xquery-20010215/>, retrieved on Dec. 29, 2005, 83 pages.
Clark, James et al., "XML PATH Language (XPath), Version 1.0," W3C, 1999, located on the internet at <http://www.w3.org/TR/xpath.html>, retrieved on Dec. 29, 2005, 37 pages.
Krishnaprasad, Muralidhar et al., "Query Rewrite in Oracle XML DB," Proceeding of the 30th VLDB Conference, 2004, pp. 1134-1145.
Unknown Author, unknown title, located on the internet at <www.cs.uku.fi/kilpelai/RDK01/lectures/Xquery.pdf>, 2001, 10 pages.
Kei Kurakawa et al., "Life Cycle Design Support Based on Environmental Information Sharing," IEEE, Feb. 1-3, 1999, Proceedings EcoDesign '99, First International Symposium, pp. 138-142.
Oliver Gunther, et al., "MMM: A Web-Based System for Sharing Statistical Computing Modules," IEEE, May-Jun. 1997, vol. 1, Issue 3, pp. 59-68.
Zhou et al., "Efficient Exploitation of Similar Subexpressions for Query Processing", Acm Sigmond, dated Jan. 1, 2007, 12 pages.
Milena G Ivanova et al., "An Architecture for Recycling Intermediates in a Column-Store", SIGMOD-PODS, dated Jun. 29, 2009, 12 pages.
Mishra, U.S. Appl. No. 15/146,799, filed May 4, 2016, Notice of Allowance, dated Sep. 28, 2018.
Chavan, U.S. Appl. No. 15/146,801, filed May 4, 2016, Advisory Action, dated Feb. 5, 2019.

\* cited by examiner

Expression Statistics Store (ESS) 100

| Expression ID | Table ID | Occurrence Count | Evaluation Count | Static Cost | Cumulative Cost | Created | Last Modified | Expression Text | ... |
|---|---|---|---|---|---|---|---|---|---|
| 102 | t | 5 | 450 | 7 | 3,150 | SCN 512 | SCN 1250 | a/b | ... |
| 104 | t | 8 | 1000 | 3 | 3,000 | SCN 203 | SCN 1321 | a+c | ... |
| ... | ... | ... | ... | ... | ... | ... | ... | ... | ... |

Column List 110

| Column ID | Table ID | Access Count | Last Accessed | ... |
|---|---|---|---|---|
| a | t | 1450 | SCN 1321 | ... |
| b | t | 450 | SCN 1250 | ... |
| c | t | 1000 | SCN 1321 | ... |
| ... | ... | ... | ... | ... |

FIG. 1

TRACKING AND MAINTAINING EXPRESSION STATISTICS ACROSS DATABASE QUERIES

CROSS-REFERENCE TO RELATED APPLICATIONS

This application claims the benefit of Provisional Appln. 62/198,572, filed Jul. 29, 2015, and Provisional Appln. 62/245,959, filed Oct. 23, 2015, the entire contents for both of which are hereby incorporated by reference as if fully set forth herein, under 35 U.S.C. § 119(e).

This application is related to:

application Ser. No. 15/146,799 entitled "MATERIALIZING EXPRESSIONS WITHIN IN-MEMORY VIRTUAL COLUMN UNITS TO ACCELERATE ANALYTIC QUERIES", filed May 4, 2016, application Ser. No. 15/146,801 entitled "MATERIALIZING INTERNAL COMPUTATIONS IN-MEMORY TO IMPROVE QUERY PERFORMANCE", filed May 4, 2016, and application Ser. No. 14/337,179, entitled "MIRRORING, IN MEMORY, DATA FROM DISK TO IMPROVE QUERY PERFORMANCE", (the "Mirroring Application") filed Jul. 21, 2014, the entire contents for each of which are hereby incorporated by reference as if fully set forth herein.

FIELD OF THE DISCLOSURE

The present disclosure relates to storing and maintaining statistics on query expressions.

BACKGROUND

Database systems often maintain statistics on the objects accessed by database queries. Such statistics may be used by a query optimizer to determine cost estimates for alternative query plans before executing a query. Generally, optimizer statistics fall into one of two categories: table statistics or column statistics. Table statistics are used by the optimizer to estimate the cost of table accesses. Example table statistics may include information on the number of rows within a table, the number of data blocks used for the table, and the average row length of a table. Column statistics are used by the optimizer to determine the distribution of values within a column. Example column statistics may include information on the number of distinct values in a column, the minimum and maximum values in the column, and histograms of column values.

Table and column statistics allow the optimizer to accurately estimate the selectivity and cardinality of simple predicates. If there is a uniform data distribution, then the cardinality for an individual predicate referencing a single column may be computed by dividing a first value representing the number of rows in the table to which the column belongs by a second value representing the number of distinct values for the column. This technique, while accurate in the case of simple predicates that involve a single column, is less effective for estimating the cardinality of complex predicates, which may comprise a conjunction of two or more predicates and involve multiple columns.

Estimating the cardinality and selectivity of complex predicates is complicated due to relationships and correlations that often exist between data stored in different columns. As an example, a particular value in a "State" column may only be associated with a single value in a "Country" column. If both values are used in a where clause to filter database records, then the optimizer may incorrectly assume that the number of distinct values in each column will independently affect the cardinality (i.e., the number of rows returned) of the predicate. Because of the relationship between the data, however, both columns will not reduce the number of rows returned for the predicate.

In order to improve the accuracy of cost estimates for complex predicates, one approach involves maintaining multi-column statistics for groups of correlated columns. Once a column group has been defined, the statistics on that column group are collected along with the table statistics and single-column statistics. The statistics may include the number of distinct values and histograms for the column group as a whole. This approach allows for more accurate cost estimates when multiple columns are used together in a query and the columns are correlated. However, maintaining extended statistics on column groups generally requires a database administrator or other user to define the column groups before the optimizer begins collecting multi-column statistics. The relationships between columns may not always be readily apparent to an administrator. Further, it may be difficult to anticipate the types of predicates that will be received by the database server. If multi-column groups are defined on column groups that are rarely used together in queries, then the optimizer may consume valuable resources tracking multi-column statistics that are rarely used.

The cost estimates produced by the optimizer based on the statistics that are maintained by conventional database systems result in cost estimates that are not perfectly accurate. Thus, it would be useful to maintain additional statistics that would further improve the accuracy of cost estimates made by the query optimizer. It is further desirable if such statistics may be used in additional ways to improve query performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which:

FIG. 1 depicts an example of an expression statistics store that tracks metadata values for various expressions, according to an embodiment;

DETAILED DESCRIPTION

Figure 2:
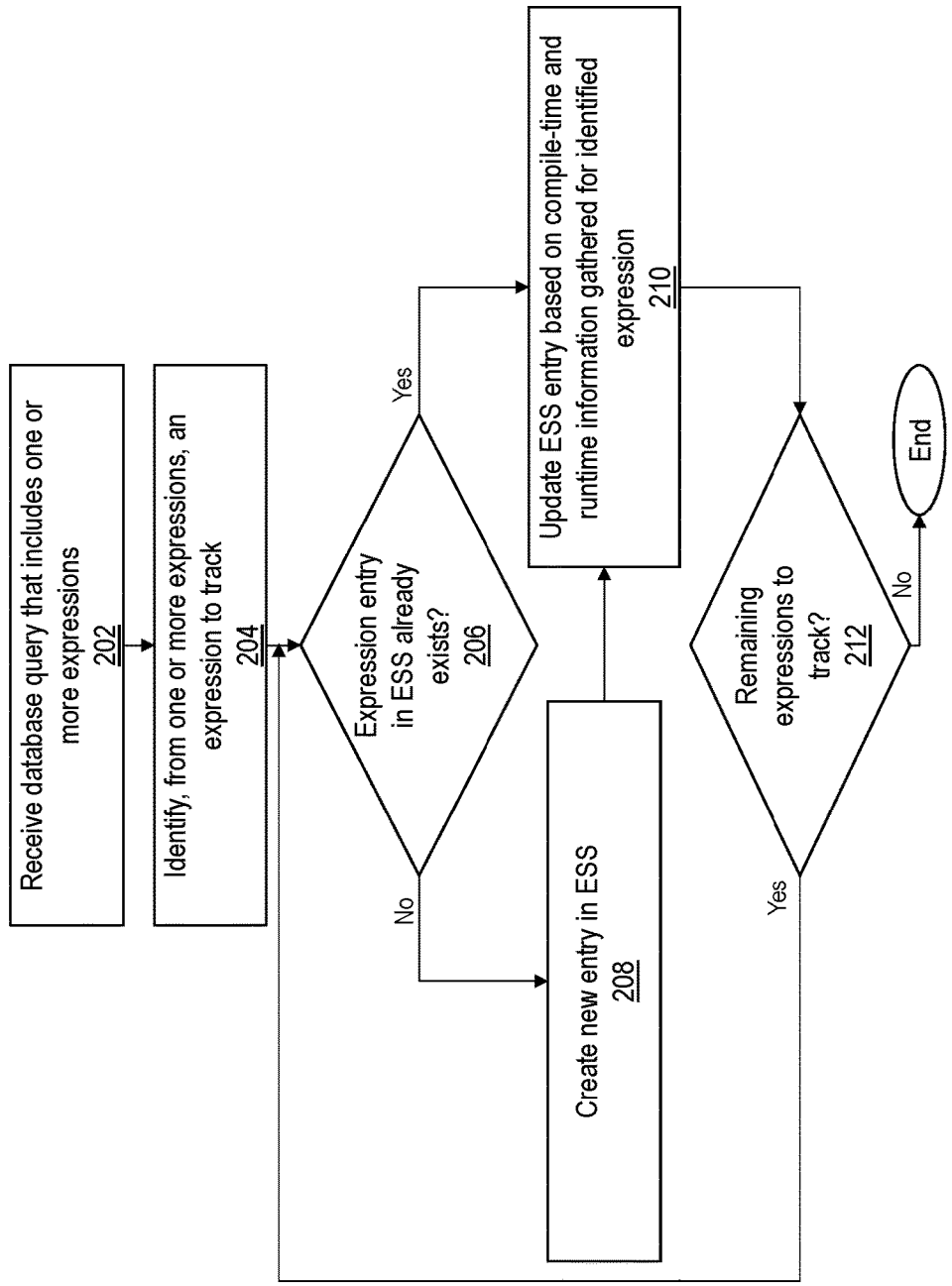
FIG. 2 is a flowchart depicting an example process for adding entries to an expression statistics store, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Database queries include constructs referred to as "expressions", where an expression is typically a combination of one or more values, operators, and/or functions. During query execution, a database server instance evaluates the query expressions to produce a query result. Query expressions may cause a database server instance to perform a variety of operations such as filtering, projecting, aggregating, sorting, or otherwise manipulating values within a database object. Some query expressions require process-intensive operations that consume a significant amount of resources per evaluation. In some cases, these expressions appear across multiple queries or multiple parts of the same query. When these expressions are evaluated over large datasets repeatedly, the performance of a database server instance may be significantly impacted.

Techniques are described herein for maintaining an expression statistics store that stores and updates metadata values for query expressions based on the occurrence of those query expressions within queries. According to various embodiments, a database server instance identifies a particular expression to track in response to receiving a database query. The database server instance then determines whether an expression statistics store includes an entry for the particular expression. Responsive to determining that the expression statistics store includes an entry for the particular expression, the database server instance updates at least one metadata value in the entry based on the occurrence of the particular expression. Responsive to determining that the expression statistics store does not include an entry for the particular expression, the database server instance adds an entry for the particular expression. This process may be repeated for additional expressions and sub-expressions, within the database query, that are identified for tracking.

The metadata values within the expression statistic store may capture various statistical information about expressions that appear in a database workload. The information may identify current and historical trends in expression usage across various database queries. The metadata values may be queried and processed by various clients to improve the performance of queries, to perform automatic data optimizations, and to optimize storage of database objects.

Expression Types

An "expression" as used herein refers to a query construct that specifies one or more operations and one or more operands on which the one or more operations are performed. The operations may be specified using a set of commands, such as structured query language (SQL) statements, mathematical operators, etc. The operands may correspond to objects, such as columns and column functions, constants, or other values. As an example, the expression "a*b" includes the operands "a" and "b", which correspond to different columns in a table. The expression further includes the multiplication operator "*", which causes a database server instance to multiply values from columns "a" and "b" when evaluating the expression. The combination and types of operators used may vary widely between different query expressions.

Expressions may occur in various locations within a database query. In a SQL statement, for example, expressions may exist in a select list, aggregation function, a SQL clause, or within some other SQL construct. Table 1 below depicts example database queries, where each query includes one or more expressions. The following queries might not be useful in real world applications, but are provided for illustrative purposes to discuss the identification and tracking of query expressions. Each query is associated with a query identifier to aid in the discussion below.

TABLE 1

SAMPLE QUERIES INCLUDING DIFFERENT EXPRESSIONS

| QUERY ID | QUERY |
| --- | --- |
| Q1 | Select sal + comm |
|  | From emp |
| Q2 | Select * |
|  | From emp |
|  | Where upper(name) = 'SCOTT' |
| Q3 | Select sum(sal) |
|  | From emp |
|  | Group by to_date(hiredate, format) − 2 |
| Q4 | Select e.sal, d.name |
|  | From emp e, dept d |
|  | Where e.deptno * 2 = d.deptno * 2 / 3 |

Queries Q1 to Q4 include various types of expressions in different parts of a query. For instance, query Q1 includes the expression "sal+comm" in the select list, Q2 includes the expression "upper (name)" in the where clause, and Q3 includes the expression "to_date(hiredate, format)—2" in the group by clause. In Q4, two expressions "deptno*2" and "deptno*2/3" are located in the where clause.

An expression may be completely subsumed by another expression, according to an embodiment. An expression that is subsumed by another other expression is also be referred to herein as a "sub-expression". An expression that is a composite of multiple sub-expressions but that is not a sub-expression itself is also referred to herein as a "top-level expression". For example, the composite expression "(a+b)*(c+d)" may be considered a top-level expression that includes the sub-expressions "a+b" and "c+d".

The example expressions provided above included constructs that were explicitly recited in a query. However, in some embodiments, a database server instance may identify and cache implicit expressions and/or other internal computations. An implicit expression is an expression that a query optimizer generates during query compilation to optimize a query execution plan even though the expression was not explicitly recited in the database query. As an example, if a database query includes the expression "a like 'cat'", the optimizer may break the expression up into two parts: "a>'c'" and "a like 'cat'". The first expression may be included as a preliminary filtering measure to reduce the number of times the relatively costly expression "a like 'cat'" is evaluated. The implicit expression may be added to a query execution plan as a target operator that operates on a set of input rows to derive a set of output rows.

Explicit and implicit expressions are examples of computations where there is a one-to-one mapping between rows in the expression results and the table rows from one or more operand columns used to compute the expression results. For instance, each row of expression results for "a+b" may be derived from values of a corresponding table row in columns "a" and "b". Other forms of computations may not have a one-to-one mapping between table rows and computation results. As an example, a bloom filter operation may apply a hash function to the values of distinct dictionary entries of a join key column. As some values within the column may not be distinct, multiple rows may map to the same dictionary entry and hash value.

Some computations are computed internally during query execution without being explicitly recited in a query. For instance, operations such as data conversions, hashing, concatenations, etc. may be performed even though such operations were not explicitly recited in the query. In some cases, these operations are selected by a query optimizer during query compilation to optimize execution of the query. A database server instance may track and cache explicit expressions, implicit expressions, internal computations, and/or other forms of computations.

Expression Statistics Store

When a database server instance is created, a repository referred to herein as an expression statistics store (ESS) is used to maintain statistics and metadata for query expressions. The ESS includes a plurality of entries, where an entry corresponds to a particular expression (or sub-expression) and stores one or more statistics for the corresponding expression. The ESS may be stored in memory and/or periodically persisted to disk. The database server instance may comprise one or more processes that have permission to access entries within the ESS.

The information stored in the ESS for each expression may vary depending on the particular implementation. FIG. 1 depicts an example of an ESS according to one embodiment. Referring to FIG. 1, ESS 100 tracks a variety of attributes for each expression, which may be categorized as follows:

Expression identifiers: These attributes are used to uniquely identify an expression. Example expression identifiers may include, without limitation, hash values, textual representation and string values of the expression, PCODE representations, etc.

Compile-time information: These attributes comprise statistics and other metadata values gathered for the corresponding expression during query compilation.

Runtime information: These attributes comprise statistics and other metadata values gathered for the corresponding expression during query execution.

ESS 100 stores static information and dynamic information about a particular expression. Static information refers to information that is fixed for a particular expression and that does not change as the frequency of usage of the particular expression changes. Example static information may include, without limitation, a table object identifier for a table accessed by an expression, an optimizer fixed cost that identifies a processing cost per evaluation of the expression, a string representation of an expression, and a list of columns that appear in the expression. Dynamic information refers to information gathered for an expression that changes based on the rate of occurrence of the expression. Examples of dynamic information may include, without limitation, dynamic optimizer costs determined based on runtime feedback, expression evaluation counts, selectivity rates that identify how many rows are filtered by an expression, and timestamps of expression evaluations.

ESS 100 stores an occurrence count value to track how many times a query expression has occurred within received database queries, according to an embodiment. Referring to FIG. 1, for instance the occurrence count for expression ID 102 and expression ID 104 indicate how many times each of the respective expressions has been included in received database queries. In order to update this value, during query compilation, a database server instance determines whether an entry for the expression already exists in ESS 100. If not, database server instance 100 creates an entry for the expression and initializes the count value to reflect the number of times the expression occurs in the received query. Upon receiving a subsequent query that includes the expression, the database server instance compiles the query and increments or otherwise updates the count value to reflect the subsequent occurrence. The occurrence count value may be used to determine which expressions are most commonly used in database queries.

ESS 100 further stores an evaluation count that tracks how many times a query expression has been evaluated. Unlike the occurrence count, which is tracked at compile time, the evaluation count is tracked at execution time. Even though an expression may appear a single time in a query, the expression may be evaluated several thousand times or more against large datasets during execution. In other cases, the expression may not be evaluated at all if previous row source operators in the query execution plan have filtered out all rows. The evaluation count thus depends on the sequence of operations in the query execution plan and the number of input rows.

The recording of the evaluation count may happen during execution of several SQL statements concurrently. Whenever the counts are updated in memory and if the component that is updating the counts has to modify data structures, the component has to take latches to protect the data structures during concurrent access. This contention for latches can affect performance. The performance penalty that results from such contention may be reduced by reducing the cases where the data structures are updated, and/or reducing the cases where latches are necessary. Further, in some cases the counts maintained do not need to be exact. In such cases it may be possible to do latchless updates. Finally, in one embodiment, the objects for which the expressions are tracked are divided into different classes, and different latches are used for each class to reduce contention.

A database server instance may use the number of rows input to a row source operator as an indicator of how many times one or more query expressions were evaluated during query execution. As an example, a row source operator that evaluates the expression "a/b" may receive, as input, one hundred rows during query execution. In response, the database server instance may increment the evaluation count within the ESS by one hundred for the corresponding expression entry, rather than indicating the evaluation count once for each individual evaluation.

Cumulative Counts

The evaluation count may be accumulated across different query executions. In the above example, the expression "a/b" was evaluated one hundred times in a first query execution. In response, a database server instance may set the evaluation count in ESS 100 for expression ID 102 to reflect one hundred evaluations of the expression. During execution of a different query, the database server instance may then evaluate the same expression "a/b" fifty times. The database server instance may then increment the evaluation count value for the expression "a/b" by fifty to reflect a cumulative total of one hundred and fifty evaluations of the expression "a/b". As the expression "a/b" is evaluated in subsequent query evaluations, the count may be similarly updated.

Selectivity Statistics

When Boolean expressions are used in the WHERE clause of a query, the expressions will be TRUE for some percentage of input rows. The lower the percentage of rows that evaluate to TRUE, the more "selective" the Boolean expression. In some embodiments, ESS 100 tracks selectivity statistics for each expression entry. The selectivity of an expression may be determined by comparing the number of rows output by a row source operator to the number of rows input by a row source operator. As an example, the row source operator that evaluates the Boolean expression "a*b=10" may receive one hundred rows as input and output ten rows. In this scenario, the evaluation count in the ESS may be incremented by one hundred. A second value in the ESS that tracks the number of output rows may be incremented by ten. As the expression is evaluated during subsequent query executions, the first and the second value may be cumulatively incremented. A selectivity value may be determined as a percentage of rows filtered out by the expression. The selectivity value may be stored in the ESS or computed on demand, depending on the particular implementation.

Cost Statistics

ESS 100 stores cost information identifying one or more costs associated with each expression being tracked. A "cost" in this context refers to an amount of resources consumed within a computing system when evaluating or otherwise processing a particular expression. A cost may be static or dynamic in nature. A static cost is a cost that remains the same throughout runtime and across execution of different queries. For example, certain processing estimates such as the number of instructions needed to evaluate an expression a single time, may be static costs.

A dynamic cost is a cost that does not remain constant throughout runtime and across execution of different queries. An example of a dynamic cost is the "runtime cost" of an expression. The runtime cost of an expression is the cumulative cost of evaluating the expression during a particular execution of a particular query. A variety of factors may affect the runtime costs of an expression. For instance, the number times that a particular expression needs to be evaluated may vary between different query executions, depending on the query execution plan. In some cases, the expression may operate on a large number of input rows, incurring a relatively high runtime cost. In other cases, the runtime cost of an expression may be much lower when a large number of rows is filtered out before the expression is evaluated. According to one embodiment, the runtime cost value of an expression, for a particular query execution, is computed by multiplying (a) the static cost of evaluating the expression with (b) the evaluation count of the expression for the particular query execution. This runtime cost value may be stored within ESS 100.

In other implementations, time-period-based cumulative cost may be computed from a combination of other statistics that are being tracked. A time-period-based cumulative cost generally represents the cumulative cost of evaluating a particular expression during a particular time period. During that time period, the expression may have been evaluated during execution of multiple queries, or multiple executions of the same query. The occurrence count, filter rate, and timing information, and/or other statistical data associated with an expression may factor into the time-period-based cumulative cost of an expression.

Different values may be weighted differently when computing the time-period-based cumulative cost for an expression. For instance, statistics that are more than a day old may be given less weight than statistics that are less than a day old. As another example, the evaluation count may be weighted more heavily than the static cost when computing the time-period-based cumulative cost. Thus, the manner in which the time-period-based cumulative cost for an expression is computed may vary from implementation to implementation.

Timing Statistics

ESS 100 further stores timing statistics for each expression entry. The timing statistics may include, without limitation:
  The time the occurrence of an expression was first recorded and the expression entry was first created;
  The time an expression was last evaluated during query execution and the expression entry was last modified;
  Timing data that identifies the intervals between expression evaluations.

The timing data may be based on logical time or actual time, depending on the particular implementation. For example, ESS 100 stores logical timestamps for both expression ID 102 and expression ID 104 that identify when the particular expression was last evaluated in relation to the occurrence of other events within a database system.

Column Tracking

In an embodiment, ESS 100 also tracks column usage statistics in addition to the expression statistics described above. To track column accesses, ESS 100 comprises column list 110, which stores various metadata values for various base columns. A "base column" in this context refers to a column that is used as an operand within a query expression.

Column list 110 tracks the following attributes for base columns, according to an embodiment:
  Column ID: This attribute includes a name or other value that identifies a base column being tracked.
  Table ID: This attribute includes a table object number, name, or other value that identifies a table to which the base column belongs.
  Access Count: This attribute identifies how many times a column has been accessed since the point in time at which statistics for the column began to be recorded in column list 110.
  Last Accessed: This attribute identifies the last time a base column was accessed.
  Database Operation ID: This attribute identifies which database operation, if any is being performed on the column. For instance, the attribute may identify whether the column is being accessed as part of a predicate evaluation, aggregation, scan, projection, etc.
  Storage Location: This attribute identifies where the column resides. For example, the attribute may specify whether the column is in-memory, on-disk, on-flash cache, etc. This attribute may further identify storage attributes of the column at the associated storage location. For instance, the attribute may specify the level of compression for the column, the storage footprint, etc.

When base column tracking is enabled, a database server instance updates statistics in both an expression list and a column list. As an example, if the database server instance receives a query with the expression "a+c", the query may update, in the expression list, the occurrence count for the expression "a+c" for the entry corresponding to expression ID 104. The database server instance may check column list 110 to determine if entries for the columns "a" and "c" already exist. If an entry for either one of these columns does not already exist in column list 110, then the database server entries creates an entry and updates one or more metadata values in the entry based on the occurrence of the columns as operands in a query expression. If the entry already exists for a column, then the corresponding metadata values for the column are updated based on the subsequent occurrence of the column as an operand in a query expression. Upon receiving the subsequent expression "a/10" the database server instance may similarly update statistics for the expression "a/10" in the expression list and the column "a" in column list 110.

As previously mentioned, the metadata values that are maintained in column list 110 include an access count value to track how many times a column has been accessed during expression evaluation. When evaluating the expression "a+c", for instance, the database server instance may update an evaluation count value for the expression "a+c" and access count values for the columns "a" and "c" that track how many times these columns have been accessed. The timing information in both the expression list and column list 110 is also updated to reflect the last time the expression was evaluated and the column was accessed. Column list 110 thus tracks how "hot" a column is in terms of the frequency with which the column is referenced and accessed by different query expressions. The column list may be sorted based on the number or frequency with which a column is referenced or accessed. A database administrator or other user may query the column list to determine which columns are most frequently accessed or referenced within a database.

Expression Statistics Store Updates

FIG. 2 is a flowchart depicting an example process for adding entries to an ESS, according to an embodiment. At step 202, the database server instance receives a database query that include one or more query expressions. The database query may be input directly by a user, received over a network from a database client, or submitted through some other application or layer of the database server instance.

At step 204, the database server instance identifies, from the one or more expressions in the database query, a query expression to track. As described further below, the database server instance may track each expression and sub-expression within a database query or some subset therein, depending on the particular implementation. The database server may parse the query, applying a set of rules and selection criteria, to determine which query expressions to track.

At step 206, the database server instance determines whether an entry within ESS 100 already exists for the identified expression. In order to determine whether an entry exists within ESS 100, the database server instance may hash a representation of the expression to perform a lookup as described in further detail below. If an ESS entry does not exist for the identified expression, then the process continues to step 208. Otherwise, the process continues to step 210.

At step 208, the database server instance creates a new entry in ESS 100 for the identified expression. When creating the new entry, the database server instance initializes a set of metadata values within the entry to reflect the first occurrence of the query expression. For instance, the database server instance may store the expression text, static cost and other static information within the expression entry.

At step 210, the database server instance updates the ESS entry based on dynamic compile-time and runtime information gathered for the identified expression. For instance, the database server instance may update a plurality of metadata values including, without limitation, the evaluation count, filter count, runtime cost, and/or timestamp information of the identified expression. The database server instance may also update column list 110 based on collected runtime information to reflect accesses of the base columns that are used to evaluate the identified expression.

ESS 100 may track expression statistics across different database queries and/or across different database clients. As an example, a first client may submit the query "select a+b from t" to a database server instance. In response, the database server instance determines whether the expression "a+b" already exists in ESS 100. If not, the database server instance creates a new entry in ESS 100 for the expression "a+b" and initializes the statistics to reflect a first occurrence of the expression. A second client may subsequently submit the query "select c*d from T where a+b=10". The database server instance may search ESS 100 for the expression "a+b" and determine that the expression already exists in ESS 100. Even though the expression is received in a different query and from a different client, the entry may be updated to reflect the second occurrence of the expression. Thus, the database server instance may update one or more of the statistics listed above. The database server instance may further add an expression entry for "c*d" to the ESS if the expression entry does not already exist. The database server instance may continue to track the expression across other database queries even though the expression may occur in different locations and co-occur with different expressions across the different queries.

Expression Identification and Tracking

As previously mentioned, the database server instance identifies expressions for tracking at step 204 of the process depicted in FIG. 2. The expressions that are identified for tracking at this step may vary from implementation to implementation. In some embodiments, the database server instance may track all expressions included within a database query. In other embodiments, the database server instance may track only top-level expressions, certain sub-expressions, or some other subset of expressions contained within the query.

A database server instance may determine whether or not to track an expression based on a set of rules and selection criteria. The rules and selection criteria may be defined based on one or more characteristics of a query expression, such as the expression type, the location within a query, or the level of the expression within a query tree. As an example, the database server instance may track only top-level expressions except for expressions of a target expression type. Continuing with the present example, the database server instance may treat aggregation functions differently than non-aggregation functions. When parsing a database query, a database server instance may find the top-most expression under the aggregation function to track rather than tracking the aggregation function itself. Table 2 below depicts sample database queries that include aggregation function expressions.

TABLE 2

SAMPLE QUERIES INCLUDING
AGGREGATION FUNCTIONS

| QUERY ID | QUERY |
|---|---|
| Q5 | Select sum(max(empno + deptno)) + sum (sal − comm*3) From emp |
| Q6 | Select l_returnflag, l_linestatus, sum(l_quantity) as sum_qty, sum(l_extendedprice) as sum_base_price, sum(l_extendedprice *(1−l_discount)) as sum_disc_price, |

TABLE 2-continued

SAMPLE QUERIES INCLUDING
AGGREGATION FUNCTIONS

| QUERY ID | QUERY |
|---|---|
| | sum (l_extendedprice *(1−l_discount)*(1+l_tax)) as sum_charge, |
| | avg(l_quantity) AS avg_QTY, avg (l_extendedprice) as avg_price, |
| | avg (l_discount) as avg_disc, count(*) as count_order |
| | From lineitem |
| | Where l_shipdate<= dateadd(dd, −90, cast('1998-12-01' as datetime)) |
| | Group by l_returnflag, l_linestatus |
| | Order by l_returnflag, l_linestatus; |

If the database server instance ignores the aggregation functions for tracking purposes and does not track sub-expressions below the immediate topmost layer under the aggregation function, then the expressions "empno+deptno" and "sal−comm*3" in Q5 are tracked, and the expressions "l_extendedprice*(1−l_discount)", "l_extendedprice*(1−l_discount)*(1+l_tax)", and "dateadd(dd, −90, cast('1998-12-01' as datetime))" in Q6 are tracked. In alternative embodiments, the database server may track the aggregation function and/or sub-expressions. As an example, the database server instance may track "max(empno+deptno)", "sum(max(empno+deptno))", "comm*3", and "sum (sal−comm*3)" in addition to the expressions "empno+deptno" and "sal−comm*3" The aggregation functions and/or sub-expressions in Q6 may similarly be identified and tracked. Thus, the expressions that are identified for tracking within a particular query may vary depending on the particular implementation.

In an embodiment, the initial expression identification occurs during query compile time. During compilation, a query compiler generates a query execution plan, which comprises an ordered set of steps obtained, in part, by translating compile-time operand structures into one or more runtime operators. The database server instance may parse the database query or the query execution plan to identify expressions for tracking. As an example, a parser may perform a lexical analysis of a database query to tokenize each expression within the database query. The parser may then perform a syntactic analysis to generate a parse tree or some other hierarchical data structure to represent the identified expression(s). A parse tree may comprise a plurality of nodes, with each node corresponding to one of a top-level expression, a sub-expression, a function or other operator, or an operand. By traversing the parse tree, the database server instance may identify the order of execution and precedence of each of the operators. The database server instance may further traverse the parse tree to determine the operands and operators within each expression and sub-expression in a database query.

During query compilation, there may be many different stages during which expressions may be transformed, eliminated, or added. As an example, an optimizer may add an implicit expression to a query execution plan, replace an explicit expression with one or more implicit expressions, and/or otherwise modify the expressions explicitly recited in a database query. In one embodiment, the database server instance identifies expressions to track after such modifications have been made, thereby ignoring explicit expressions that have been replaced or otherwise removed. In another embodiment, the database server instance tracks explicit expressions even if those expressions have been removed by a query optimizer at compile time.

Once the database server instance has determined which expressions to track, the database server instance may store expression tracking information to track the expressions during runtime. In one embodiment, the expression tracking information includes a mapping between expressions and one or more nodes, such as row source identifiers, within a query execution plan. After each expression has been identified and added to the map, the database server instance stores the expression tracking information in a database cursor or some other control structure that persists through query execution. During execution, the database server instance determines statistics for the nodes corresponding to expressions that are being tracked and, for each given node, uses the map to perform a lookup of a set of one or more expressions corresponding to the node. The database server instance may then determine which expression statistics to update in the ESS.

In an embodiment, the database server gathers information for tracked expressions during both compile-time and runtime. During compile time, the database server instance may determine the static information for new expression entries in ESS 100. For instance, after identifying an expression for tracking, the database server instance may compute and store, within ESS 100 a processing cost for the expression based on an estimated number of clock cycles or number of instructions that will be executed per evaluation. The database server instance may further store other static information such as the expression text and other expression IDs within ESS 100.

Dynamic information may be gathered during both compile-time and runtime. For instance, during compile time, the database server instance may update the occurrence count of the expression within ESS 100. During query execution, the database server instance may update the evaluation count, runtime cost, and timing information within ESS 100.

Determining which Expressions to Track

According to one embodiment, the database server instance may apply the set of rules and selection criteria when traversing the parse trees to identify which expressions to track. For example, if an incoming query's recorded performance (from previous executions) is below a threshold, then the database server may choose to track some or all of the expressions in the query. Similarly, if an incoming query's consumption of resources during previous executions exceeds a threshold, then the database server may choose to track some or all of the expressions in the query.
Expression Mapping When an entry for an expression is created within ESS 100, a unique identifier for the expression is stored as part of the entry. The format of the identifier may vary from implementation to implementation. For example, an identifier may be a string representation of the expression, a compiled representation of the expression, a hash value obtained by applying a hash function to a representation of the expression, or some other value that uniquely identifies the expression within ESS 100.

Various data structures may be used to implement ESS 100, depending on the particular implementation. In one embodiment, ESS 100 is implemented as a hash table to facilitate efficient lookups of expressions. However, other data structures may also be used in addition or as an alternative to a hash table. Examples include, without limitation tree structures, linked lists, and other associative arrays.

Figure 3:
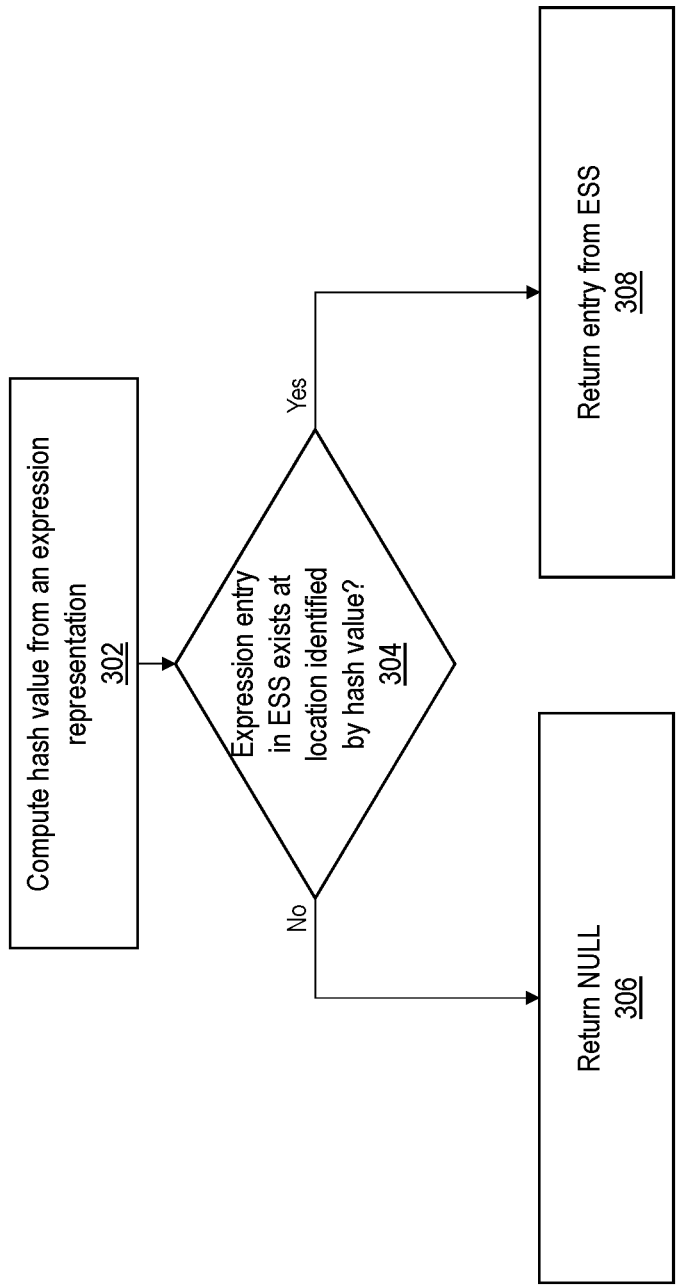
FIG. 3 is a flowchart depicting an example process for performing lookups of expressions using a hash function, according to an embodiment.

FIG. 3 is a flowchart depicting an example process for performing lookups of expressions using a hash function. In one embodiment, prior to performing any look up for an expression, the expression is normalized so that semantically identical expressions (e.g. a+b and b+a) will match. Numerous normalization techniques may be used for normalizing the expressions, and the techniques described herein are not limited to any particular normalization technique. After expression normalization, at step 302, the database server computes a hash value for an expression representation. The manner in which a hash value is computed from an expression representation may vary from implementation to implementation. A PCODE representation of an expression, for example, comprises bytecode that is interpreted at query runtime. The PCODE representation may include, among other items, a) an opcode, b) column operands (as IDs), and/or c) constant operands (as length/value pairs). The hash value for a PCODE representation may be obtained by applying a hash operator to a combination of values included in the PCODE representation. Example commands for determining a hash value of an expression representation may include, without limitation:

HASH opcode, column1, column2; and/or
HASH opcode, column1, constant data, constant data length.

In another embodiment, a hash function may be applied to a string or other text representation of the expression. For example, the database server instance may hash a string representation of the expression "a/b" to lookup the expression within a hash table.

At step 304, the database server instance searches ESS 100 to determine whether an entry at the location identified by the hash value already exists. If an entry does not exist within the hash table, then the process continues to step 306. Otherwise, the process continues to step 308.

At step 306, the database server instance returns a null value indicating that the entry does not exist in ESS 100. If the database server instance has chosen to track the expression for which the lookup is performed, then the database server instance may create a new entry for the corresponding expression at this step.

At step 308, the record for the expression is returned if it exists in ESS 100. When performing expression tracking, the database server instance may update the dynamic information within the entry at this step.

The simplified flowchart illustrated in FIG. 3 assumes that no collisions occur. However, in order to prevent collisions from producing incorrect records, the database server instance typically has to do more than merely determine that an entry exists at the location identified by the hash value. For example, in one embodiment, after finding a value at the location identified by the hash value, the database server instance compares an expression string or other representations stored within the entry with the expression string or other representation used to perform the lookup. If the expression strings match, then the expression record is returned at step 308. If the expression strings do not match, then the process may check if other entries are separately chained to the current hash bucket and have a matching expression string. If a separate entry having a matching expression string is detected, it may be returned as a result. Otherwise, a null value may be returned and/or a new entry in ESS 100 may be created for the expression.

Co-Occurrence Expression Tracking

As indicated above, ESS 100 may track individual expressions across different database queries. In addition or alternatively, the ESS may track the co-occurrence of multiple expressions within queries. Two or more expressions "co-occur" when they are included in the same query and evaluated as part of the same query execution. A database server instance may generate a new entry in ESS 100 for such co-occurring expressions to track one or more statistical values for these expressions. The entry may track the frequency with which the expressions co-occur and other statistics, per the description above. In the case of Boolean expressions that may appear in the WHERE clause of a query, the entry may also track the combined selectivity of Boolean expressions.

In one embodiment, the database server instance maps co-occurring expressions to ESS 100 by applying a hash function to a combination of hash values, where each of the hash values corresponds to a different expression. As an example, the following command may be used to derive a hash value from a combination of hash values:

HASH opcode, hash value1, hash_value2

In the above command "hash_value1" is the hash value obtained by hashing the representation of a first expression, and "hash_value2" is the hash value obtained by hashing the representation of a second expression that co-occurs with the first expression. The command applies the hash function to the combination of these values to derive a new hash value for combined expressions. The new hash value is used to map the co-occurring expressions to a corresponding entry in ESS 100. The entry may be used to track and store statistics that are based on the co-occurrence of the expressions.

ESS Query Processing

A database server instance may process various queries that are submitted against ESS 100. Queries may be submitted by a user, such as a database administrator or separate application program, by another layer of the database, or by some other client. The queries may request data from ESS 100 that satisfy a set of criteria that are defined in terms of the expression attributes tracked by ESS 100.

There are numerous ways in which a client may query ESS 100. As an example, a query may select the top n most costly expressions as determined by time-period-based cumulative cost, the top n most frequently evaluated expression, the top n most selective expressions, the top n most recently evaluated expressions etc. As another example, the query may select expressions that were evaluated within the past hour and/or that satisfy a certain cost threshold. Similarly, other analytic queries that target ESS 100 may be formed to provide insights into how expressions are being used within a database environment.

In response to receiving a query, a database server instance compares the query criteria against metadata values stored in one or more columns of ESS 100. For example, if a client requests expressions that exceed a certain runtime cost threshold, the database server may compare the threshold against the runtime cost value for each expression entry within ESS 100. Similarly, the database server instance may compare criteria against the occurrence count, evaluation count, selectivity rate, timing information, and/or another value or combination of values maintained within ESS 100. Based on the comparison, the database server instance generates and returns a set of expression records that satisfy the query criteria.

ESS Maintenance

A database server instance may perform one or more maintenance operations on ESS 100 periodically, on-demand, or in response to a detecting a shortage in memory or some other event. Maintenance operations may include, without limitation:

- Flushing one or more entries within ESS 100 to disk or other persistent storage;
- Purging one or more entries within ESS 100 from memory and/or persistent storage.

Flushing ESS entries to disk allows a database server instance to persistently store expression statistics and potentially free up memory. After flushing an expression entry, the corresponding hash table element may be freed from memory or may be reused to track further statistics for the expression.

In one embodiment, the in-memory ESS records track "current" expression statistics. Expression statistics are considered current if the statistics take into account all expression evaluations that occurred in a time period that includes the most recent expression evaluations. For example, the current expression statistics may reflect all expression evaluations in the last day, the last three days, or the last seven days. The duration of the "current" time period may vary from implementation to implementation.

In one embodiment, the statistics for the expressions are periodically flushed to persistent storage. In one embodiment, when flushed to persistent storage, the current statistics can be combined with previously-flushed statistics to increase the time period covered by the previously-flushed statistics. The frequency at which the current statistics are combined with previous statistics is referred to herein as the "threshold period of time". For example, assuming that the threshold period of time is one day, the statistics for the current day can be combined with previously-flushed statistics for the previous day to create a cumulative set of statistics that covers a period of two days.

The cumulative set of statistics may capture expression stats for a particular expression from the first time the expression was received, evaluated, or otherwise captured by the database server instance. Thus, statistics that are "cumulative" may track evaluations and occurrences of the expression for a greater period of time than the threshold period of time. Cumulative statistics may be combined with the current statistics by adding, averaging, or performing some other aggregation function.

In addition to statistics that track from the beginning, or that track for a current time period (e.g. the most recent 1 or 2 days), more generic "snapshots" of the statistics may be implemented. For example, in one embodiment, the ESS records track the counts for specific intervals (e.g. cumulative statistics that cover all evaluations of a particular expression between time T1 and time T2). The interval-cumulative statistics for any given interval are collectively referred to as the "snapshot" for the interval. When such snapshots are kept for many distinct intervals, the interval-cumulative statistics of multiple snapshots may be combined to cover a larger interval. For example, the statistics of the snapshot that covers time T1 to time T2 can be combined with the statistics of the snapshot that covers time T2 to time T3 to get the cumulative statistics for the interval of T1 to T3. Thus, aggregate information for ranges of differing durations can be computed from the counts in these snapshots. As another example, in one embodiment, a snapshot is made for each day's statistics. Using these snapshots, the statistics may be aggregated over any range of days. In one embodiment, clients can cause a new snapshot to be started at any point in time (a "reset point"), thereby allowing cumulative statistics to be computed for intervals that start at that reset point. For example, a client can cause a new snapshot to be started at midnight of December $31^{st}$, to allow the system to determine cumulative statistics "as of the start of the year".

Entries may be purged from ESS 100 to free up memory and disk space. The manner in which expressions are purged may vary depending on the particular implementation. In one example, purging may happen if the expression has not been evaluated within a threshold period of time. As another example, an expression record may be purged if the frequency of evaluation of the corresponding expression is less than a threshold. As another example, an expression record may be purged if the runtime cost (or time-based cumulative cost) of the corresponding expression is less than a threshold. As another example, an expression entry may be invalidated and purged if any of the base columns of the expression are dropped or modified. Purging the expression record may cause the expression record to be marked as deleted and/or cause the expression record to be removed from memory and disk.

Using Expression Statistics for Expression Result Caching

A database server instance may perform caching and query tuning operations based on the statistics maintained in ESS 100. Expression caching and query tuning allow for faster execution of database queries. Example caching and query tuning operations may include, without limitation:

- Storing an evaluation result for an expression in an in-memory cache;
- Modifying a query execution plan to access evaluation results from the in-memory cache; and
- Rearranging an order in which expressions are evaluated based on the statistics maintained for those expressions.

In one embodiment, a database server instance determines if an evaluation result of a particular expression should be cached based on one or more statistics maintained in the corresponding ESS entry for the expression. The statistics used by the database server to make the determination may vary depending on the particular implementation. As an example, the determination may be made based on the cost of the expression. If the runtime cost of an expression exceeds a threshold, the database server instance may cache the evaluation result of the expression. As another example, rather than compare the cost to a threshold, the database server instance may cache the top n most costly expressions, as determined by the runtime cost attribute values. In another example, the database server instance may cache the top n most frequently evaluated expressions, as determined by the evaluation count attribute values maintained in ESS 100.

When an expression result is cached, the query optimizer may rewrite a query and/or a query execution plan to access the expression result. With respect to a row source operator, the operator may be modified such that one or more internal computations are no longer performed. The row source operator may further be modified to receive, as an input, the expression result from the cache. Thus, the row source operator may output the result records from the cache without evaluating the expression against the column operands. Although no evaluation is performed, the evaluation count in the corresponding ESS entry may still be updated.

Using Expression Statistics for Query Tuning

As previously indicated, in addition or as an alternative to expression caching, the database server instance may further perform query tuning by reordering query expression evaluations based on the selectivity and/or other costs of the expressions. When an initial query execution plan is generated, the steps of the plan may evaluate a first predicate before a second predicate. If the database server instance determines, from the statistics maintained in ESS 100, that the expression contained in the second predicate has less processing cost per evaluation than the expression contained in the first predicate, then the database server instance may switch the order of evaluation such that the second predicate expression is evaluated before the first predicate expression.

Similarly, if the database server instance determines, based on the statistics maintained in ESS 100, that the expression contained in the second predicate is more likely to be selective than the expression contained in the first predicate, then the database server instance may switch the order of evaluation such that the second predicate expression is evaluated before the first predicate expression. If the statistics indicate that one expression has higher selectivity, but the other expression has lower execution cost, then the database server could determine to execute the first predicate (P1) before the second predicate (P2) if (cost of P1 evaluation) (# of input rows)+(cost of P2 evaluation) (selectivity of P1) (# of input rows)<(cost of P2 evaluation) (# of input rows)+(cost of P1 evaluation) (selectivity of P2) (# of input rows). Conversely, the database server would execute P2 before P1 if (cost of P1 evaluation) (# of input rows)+(cost of P2 evaluation) (selectivity of P1) (# of input rows)>(cost of P2 evaluation) (# of input rows)+(cost of P1 evaluation) (selectivity of P2) (# of input rows).

Automatic Data Optimization

A database server instance may perform automatic data optimization based on the statistics maintained in ESS 100. Automatic data optimization operations allow policies to be defined for data compression and/or data movement. The policies may be defined in terms of one or more expression statistics that are tracked by ESS 100. Example automatic data optimization operations include, without limitation:

Determining what compression algorithm and level of compression to apply to a column or other database object;

Determining where to store a column or other database object; and

Determining a format for storing a column or database object.

The policies under which data is compressed and moved may vary from implementation to implementation. In the context of compression, for example, a database server instance may determine what compression algorithm and level of compression to apply based on the frequency with which a column is accessed by various query expressions. If the column list indicates that a column is frequently accessed, the database server instance may reduce or otherwise change the level of compression on the column to allow for faster accesses. Conversely, if the column list indicates that a particular column is accessed less than a threshold amount, the database server instance may increase or otherwise change the level of compression to reduce the storage space consumed by the column. As another example, the database server instance may determine what compression algorithm and level of compression to apply based on the average cost of expressions that are evaluated against a particular column. As the average cost increases, the level of compression may be reduced.

In one embodiment, the database server determines which database objects to store in-memory based on the expression statistics maintained in ESS 100. The database server instance may query ESS 100 to determine which expressions and base columns are currently "hot". If a column is frequently accessed by expressions, an automatic data optimization process migrates the column from disk to memory, and reformats the data from a persistent format (e.g., a compressed row-major format) to a mirror format (e.g., compressed column-major) to allow for more efficient query processing. Techniques for performing such column migrations are described in the Mirroring Application. Conversely, if a column is not frequently accessed during expression evaluations, then the automatic data optimization process may drop an in-memory representation of the column to free up space in memory for more frequently accessed columns. Similarly, if an expression is costly and frequently accessed, the automatic data optimization process may create a virtual column for storing the expression results in memory. If the expression becomes cold, then the automatic data optimization process may evict the corresponding virtual column from memory.

Database Advisor and Report Generation

A database server instance may perform advisory and report generation operations based on the statistics maintained in the ESS. The advisory and report generation operations may recommend or otherwise indicate suggested changes in the database to improve performance. Example advisory and report generation may include, without limitation:

Recommending in-memory storage for columns or other database objects;

Recommending compression and data migration for columns or other database objects;

Recommending expressions to be added to a table as a virtual column for in-memory caching of the expression; and Generating periodic or on-demand reports that identify statistical trends associated with the expressions being tracked.

In one embodiment, a database server generates and displays reports identifying database objects recommended for in-memory storage. As an example, the database server may identify, from column list 110, which columns are most frequently operated on by tracked query expressions. If a column is frequently operated on by the expressions, the database server instance may recommend enabling in-memory storage for the column or the table in which the column is located. In addition or alternatively, the report may recommend dropping one or more columns from memory that are not frequently operated on by the expressions.

The database server instance may generate various other reports based on the statistics in ESS 100. For example, a report may identify the top n most costly expressions, the top n most frequently evaluated expressions, the top n most frequently accessed columns, etc. The reports may further generate snapshots of the expression statistics at various points in time. For instance, a report may identify the top n most frequently evaluated expressions within the past day versus the top n most frequently evaluated expressions within the past month. In another example, a report may identify trends based on changes in the underlying expression statistics. Thus, the report may identify, sort, and rank expressions based on their change in popularity. Similarly, the database server instance may generate other reports that sort and rank data based on other statistics or combination of statistics stored within ESS 100.

Multi-Client Expression Statistics Store

According to one embodiment, the same expression statistics store may serve multiple clients, where a client may be another application, application layer, or service. For example, the expression statistics may be used by a query optimizer to rewrite a query, a data optimizer to determine what level of compression to apply to a database object, an in-memory database client to determine which columns to store in memory, etc.

The expressions tracked in ESS 100 can be used by a statistics gathering component to gather statistics for the "top" expressions. In this case, the statistics gathering component would be one client of ESS 100. The component that stores materialized values in an IMC may be another client of ESS 100. ESS 100 can be used by other clients as well.

Hardware Overview

In some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
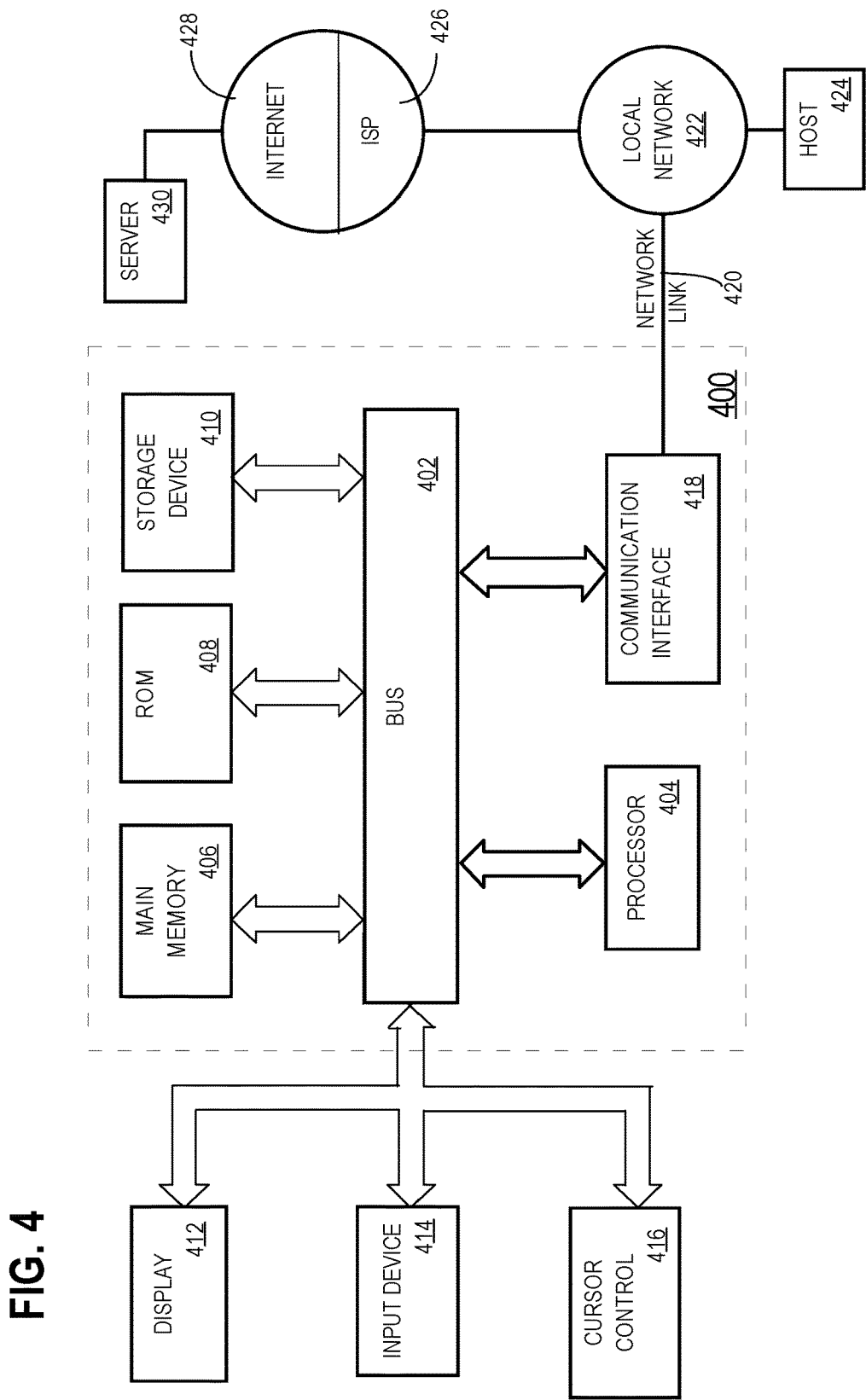
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, by a database server instance, an expression statistics store that includes metadata values for each expression of a plurality of expressions;
   wherein each expression of the plurality of expressions, when evaluated by the database server instance, causes the database server instance to perform a corresponding operation using values from at least one column of a table in a database managed by the database server instance;
   receiving, by the database server instance, a database query;
   parsing, by the database server instance, the database query to identify expressions within the database query;
   based on the parsing, identifying an occurrence of a particular expression within the database query;
   in response to identifying the occurrence of the particular expression within the database query, the database server instance updating the expression statistics store to reflect the occurrence of the particular expression;
   determining, from the metadata values maintained for the particular expression, a time-period-based cumulative cost for the particular expression;
   wherein the time-period-based cumulative cost is determined, based at least in part, on a fixed cost per evaluation of the particular expression and on an evaluation count that tracks how many times the particular expression was evaluated;
   based, at least in part, on the time-period-based cumulative cost for the particular expression, performing at least one of:
      storing an evaluation result for the particular expression in an in-memory cache, and modifying an execution plan of a query that includes the particular expression to access the evaluation results in the in-memory cache rather than evaluate the particular expression;
      rearranging an order in which expressions in a query that includes the particular expression are evaluated;
      changing a level of compression applied to a column or database object referenced in the particular expression;
      determining where to store a column or database object referenced in the particular expression; or
      determining a format for storing a column or database object referenced in the particular expression.

2. The method of claim 1 wherein updating the expression statistics store to reflect the occurrence of the particular expression comprises:
   the database server instance performing the steps of:
      determining whether the expression statistics store includes an entry for the particular expression;
      responsive to determining that the expression statistics store includes an entry for the particular expression, updating at least one metadata value in the entry based on the occurrence of the particular expression; and
      responsive to determining that the expression statistics store does not include an entry for the particular expression, adding to the expression statistics store an entry for the particular expression, wherein the entry includes metadata values that are based on the occurrence of the particular expression.

3. The method of claim 2, wherein the step of updating at least one metadata value in the entry based on the occurrence of the particular expression comprises updating a counter that tracks how many times the particular expression has occurred across different queries.

4. The method of claim 2, further comprising:
   receiving a second query that requests records for expressions that satisfy a set of criteria;
   in response to receiving the second query:
      comparing the set of criteria to at least one metadata value in or derived from the entry to determine whether a cost associated with the particular expression satisfies a threshold;
      responsive to determining that the cost associated with the particular expression satisfies the threshold, including the entry for the particular expression in a result set for the second query.

5. The method of claim 4, wherein the at least one metadata value corresponds to a cost that is based on how many times the particular expression was evaluated during a particular period, wherein the particular period is one of:
   a period that begins when the particular expression was first recorded in the expression statistics store;
   a period that begins a fixed period of time prior to current time;
   a period that covers a range of snapshots of statistics maintained in the expression statistics store; or
   a period that begins at a point at which a client reset statistics in the expression statistics store.

6. The method of claim 1, the method further comprising:
performing at least one evaluation of the particular expression during execution of the database query; and
updating at least one metadata value in an entry, within the expression statistics store, for the particular expression based on the at least one evaluation of the particular expression.

7. The method of claim 6, wherein the step of updating at least one metadata value in the entry for the particular expression based on the at least one evaluation comprises updating at least one of:
an evaluation count that indicates how many times the particular expression has been evaluated,
a selectivity rate of the particular expression, or
timing information that indicates when the particular expression was last evaluated.

8. The method of claim 6 wherein the expression statistics store comprises a ranking of a plurality of predicates based upon a processing cost of evaluating each predicate during a query evaluation and wherein performing at least one evaluation of the particular expression during execution of the database query comprises evaluating the plurality of predicates based upon the ranking of the plurality of predicates.

9. The method of claim 1 wherein, based on metadata values stored in the expression statistics store for the particular expression, storing an evaluation result for the particular expression in an in-memory cache, and modifying an execution plan of a query that includes the particular expression to access the evaluation results in the in-memory cache rather than evaluate the particular expression.

10. The method of claim 1 wherein, based on metadata values stored in the expression statistics store for the particular expression, rearrange an order in which expressions in a query that includes the particular expression are evaluated.

11. The method of claim 1 wherein, based on metadata values stored in the expression statistics store for the particular expression, determine where to store a column or database object referenced in the particular expression.

12. The method of claim 1 wherein, based on metadata values stored in the expression statistics store for the particular expression, determine a format for storing a column or database object referenced in the particular expression.

13. One or more non-transitory computer-readable media storing instructions which, when executed by one or more processors, cause:
maintaining, by a database server instance, an expression statistics store that includes metadata values for each expression of a plurality of expressions;
wherein each expression of the plurality of expressions, when evaluated by the database server instance, causes the database server instance to perform a corresponding operation using values from at least one column of a table in a database managed by the database server instance;
receiving, by the database server instance, a database query;
parsing, by the database server instance, the database query to identify expressions within the database query;
based on the parsing, identifying an occurrence of a particular expression within the database query;
in response to identifying the occurrence of the particular expression within the database query, the database server instance updating the expression statistics store to reflect the occurrence of the particular expression;
determining, from the metadata values maintained for the particular expression, a time-period-based cumulative cost for the particular expression;
wherein the time-period-based cumulative cost is determined, based at least in part, on a fixed cost per evaluation of the particular expression and on an evaluation count that tracks how many times the particular expression was evaluated;
based, at least in part, on the time-period-based cumulative cost for the particular expression, performing at least one of:
storing an evaluation result for the particular expression in an in-memory cache, and modifying an execution plan of a query that includes the particular expression to access the evaluation results in the in-memory cache rather than evaluate the particular expression;
rearranging an order in which expressions in a query that includes the particular expression are evaluated;
changing a level of compression applied to a column or database object referenced in the particular expression;
determining where to store a column or database object referenced in the particular expression; or
determining a format for storing a column or database object referenced in the particular expression.

14. The one or more non-transitory computer-readable media of claim 13 wherein updating the expression statistics store to reflect the occurrence of the particular expression comprises:
the database server instance performing the steps of:
determining whether the expression statistics store includes an entry for the particular expression;
responsive to determining that the expression statistics store includes an entry for the particular expression, updating at least one metadata value in the entry based on the occurrence of the particular expression; and
responsive to determining that the expression statistics store does not include an entry for the particular expression, adding to the expression statistics store an entry for the particular expression, wherein the entry includes metadata values that are based on the occurrence of the particular expression.

15. The one or more non-transitory computer-readable media of claim 14, wherein the step of updating at least one metadata value in the entry based on the occurrence of the particular expression comprises updating a counter that tracks how many times the particular expression has occurred across different queries.

16. The one or more non-transitory computer-readable media of claim 14, wherein the metadata values identify a time-period-based cumulative cost for the particular expression; wherein the time-period-based cumulative cost is determined, based at least in part, on a fixed cost per evaluation of the particular expression and on an evaluation count that tracks how many times the particular expression was evaluated.

17. The one or more non-transitory computer-readable media of claim 14, storing further instructions that cause:
receiving a second query that requests records for expressions that satisfy a set of criteria;
in response to receiving the second query:
comparing the set of criteria to at least one metadata value in or derived from the entry to determine whether a cost associated with the particular expression satisfies a threshold;

responsive to determining that the cost associated with the particular expression satisfies the threshold, including the entry for the particular expression in a result set for the second query.

18. The one or more non-transitory computer-readable media of claim 17, wherein the at least one metadata value corresponds to a cost that is based on how many times the particular expression was evaluated during a particular period, wherein the particular period is one of:
   a period that begins when the particular expression was first recorded in the expression statistics store;
   a period that begins a fixed period of time prior to current time;
   a period that covers a range of snapshots of statistics maintained in the expression statistics store; or
   a period that begins at a point at which a client reset statistics in the expression statistics store.

19. The one or more non-transitory computer-readable media of claim 13, storing further instructions that cause:
   performing at least one evaluation of the particular expression during execution of the database query; and
   updating at least one metadata value in an entry, within the expression statistics store, for the particular expression based on the at least one evaluation of the particular expression.

20. The one or more non-transitory computer-readable media of claim 19, wherein the step of updating at least one metadata value in the entry for the particular expression based on the at least one evaluation comprises updating at least one of:
   an evaluation count that indicates how many times the particular expression has been evaluated,
   a selectivity rate of the particular expression, or
   timing information that indicates when the particular expression was last evaluated.

* * * * *